Dec. 30, 1947.     H. O. NIEDERER ET AL     2,433,575
DEVICE FOR GRADING ARTICLES ACCORDING TO WEIGHT BY STEP-BY-STEP
VIBRATIONLESS ADVANCEMENT OVER A PLURALITY OF SCALES
Filed Aug. 25, 1942     3 Sheets-Sheet 1

INVENTORS
HERBERT O. NIEDERER
OTTO C. NIEDERER
BY
Albert Sperry
ATTORNEY

INVENTORS
HERBERT O. NIEDERER
OTTO C. NIEDERER

BY Albert Sperry

ATTORNEY

Dec. 30, 1947.  H. O. NIEDERER ET AL  2,433,575
DEVICE FOR GRADING ARTICLES ACCORDING TO WEIGHT BY STEP-BY-STEP
VIBRATIONLESS ADVANCEMENT OVER A PLURALITY OF SCALES
Filed Aug. 25, 1942  3 Sheets-Sheet 3

INVENTORS
HERBERT O. NIEDERER
OTTO C. NIEDERER
BY
Albert Sperry
ATTORNEY

Patented Dec. 30, 1947

2,433,575

UNITED STATES PATENT OFFICE 2,433,575

DEVICE FOR GRADING ARTICLES ACCORDING TO WEIGHT BY STEP-BY-STEP VIBRATIONLESS ADVANCEMENT OVER A PLURALITY OF SCALES

Herbert O. Niederer and Otto C. Niederer, Titusville, N. J.

Application August 25, 1942, Serial No. 456,302

6 Claims. (Cl. 209—121)

Our invention relates to devices for grading or sorting articles by weight.

In our issued Patent No. 2,246,597 we have shown and described a device which is particularly designed for grading eggs and has proved to be most successful. The present invention relates to improvements in devices of this character and while adapted for use in grading eggs and many other articles it is here shown and described as used in grading projectiles for use in fire arms, rifles and cannon.

In developing a grading device of this character it was found that the permissible variation in weight of the articles to be graded was very small while the articles themselves are relatively heavy. The jarring and impact resulting from movement of the articles and operation of the weighing device place very severe strains upon the pivot pins and bearings used in the weighing devices and adversely influence the accuracy of the device.

In order to overcome these objections to devices of the prior art we have developed a grading or sorting which has no lost motion or loose connections and in which articles are moved from one weighing device to another without lifting and lowering them as they are advanced. The article moving means are actuated in a continuous and deliberate manner to locate the articles on the weighing devices without shock or impact and the operation of the weighing devices is controlled so as to insure smooth uniform action thereof.

One of the objects of the present invention is to provide a device for grading or sorting articles by weight in which the articles are moved from one position to another without lifting and lowering the articles and by a smooth continuous operation.

Another object of our invention is to provide a device for grading articles by weight in which the operation of the weighing device is controlled in a novel manner.

A further object of our invention is to provide a device for grading or sorting articles which is simple in construction, easily and automatically operated and economical to produce.

These and other objects and features of our invention will appear from the following description thereof in which reference is made to the figures of the accompanying drawings.

In the drawings.

Figure 1:
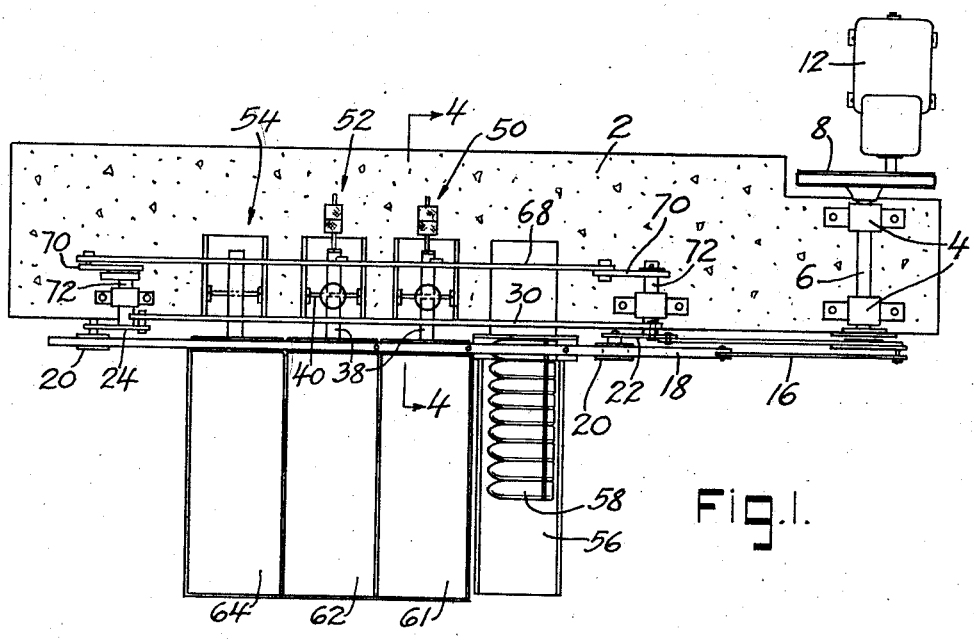
Fig. 1 is a plan view of a typical sorting device embodying the present invention.

In that form of the invention illustrated in the drawings, a base 2 is provided which preferably is formed of concrete or other material which is rigid and tends to suppress vibration. Bearing blocks 4 are mounted on the base for supporting a drive shaft 6 provided with a pulley 8, driven by a belt 10 from a small motor 12, which is provided with a reduction gear. The opposite end of the drive shaft 6 is provided with a crank arm 14, connected by a link 16 to article moving bar 18 to reciprocate the bar as shaft 6 rotates. The bar 18 is supported on rollers 20 mounted on rocker members 22 and 24 pivotally mounted at 26 and 28 respectively and connected by the rod 30. The rocker members are oscillated by a link 32 connected to the rocker member 22 and actuated by an eccentric member 34 mounted on the drive shaft 6. In this way the rocker members 22 and 24 are oscillated to raise and lower the rollers 20 as the bar 18 reciprocates so that the bar is caused to move continuously through an elliptical path in a clockwise direction, as seen in Figs. 2 and 3.

Figure 3:
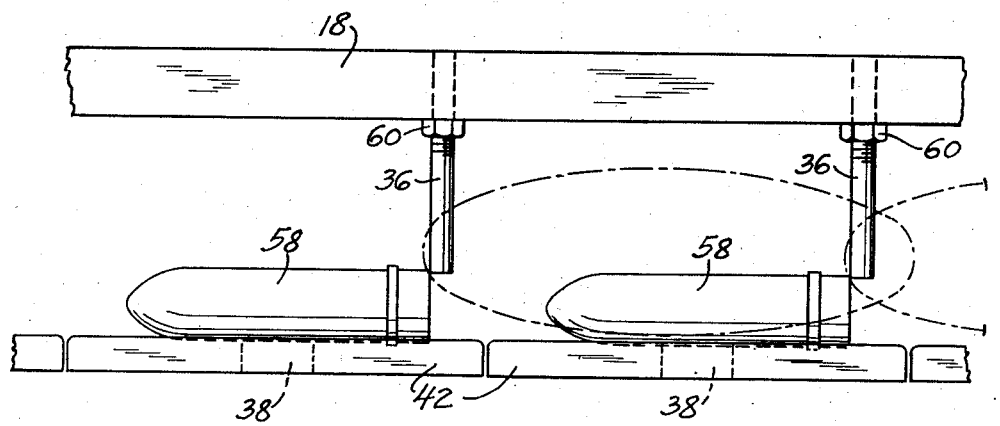
Fig. 3 is a diagrammatic view on an enlarged scale illustrating the action of the article moving means of Fig. 1.

The bar 18 is provided with downwardly extending pins 36 which are spaced apart sufficient distances so that each pin will move downward at the right hand end of the articles being sorted and as seen in Fig. 3, and will engage an article so as to move it to the left and to a predetermined position before passing upward out of engagement therewith. The article moving means thus serve to advance each article one step in its movement along the device in each cycle of operation.

Figure 4:
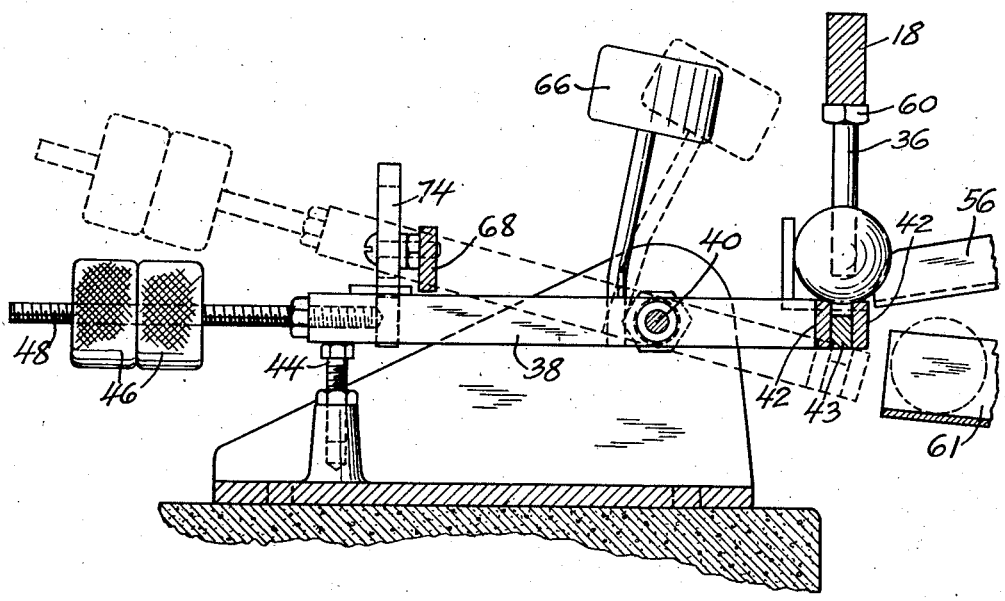
Fig. 4 is a vertical sectional view taken on the line 4—4 of Fig. 1.
Figure 5:
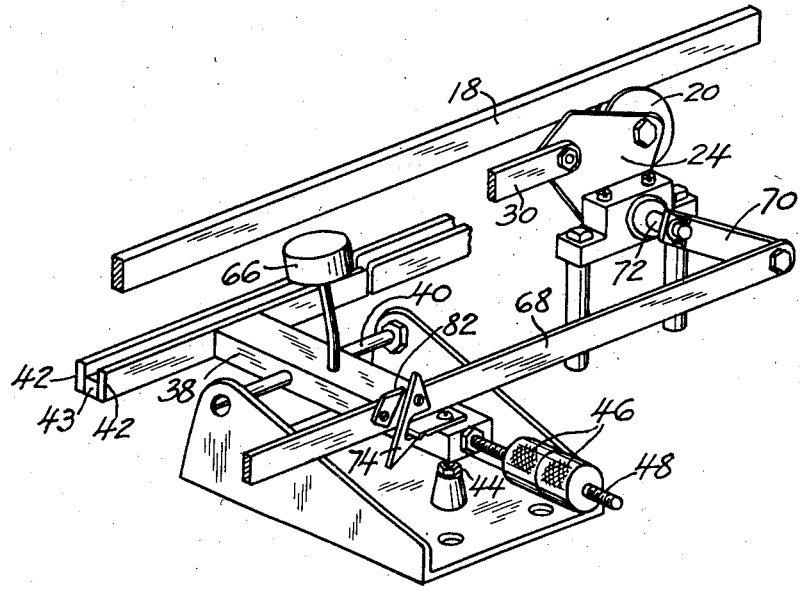
Fig. 5 is an enlarged view in perspective of one of the weighing devices embodied in the construction shown in Fig. 1.

The weighing devices used are similar in construction and as shown in Figs. 4 and 5, each device is provided with a balance beam 38 mounted on pivot pins 40 and provided with spaced article receiving members 42 joined by the connecting member 43. The article receiving members when arranged in alignment cooperate to form a track along which the articles to be weighed may be advanced by the article moving means from one weighing device to another. Each of the weighing devices is therefore provided with a stop 44 engageable by the balance beam to position the article receiving members so that they are in alignment when the right hand end of the beam, as seen in Figs. 3 and 4, is in its lowered position. Adjustment of each of the weighing devices is effected by knurled weights 46 on the threaded rods 48 projecting from the ends of the balance beams.

Figure 2:
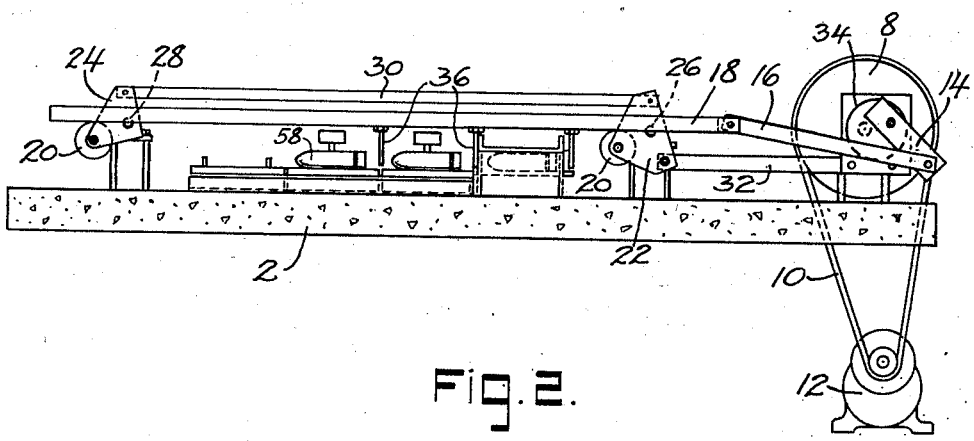
Fig. 2 is a front elevation of the sorting device shown in Fig. 1.

As shown in Figs. 1 and 2, three weighing devices 50, 52 and 54 may be employed and adjusted so that the first weighing device 50 will be tilted only by the heaviest articles to be sorted, the weighing device 52 is tilted by those articles which are too light in weight to actuate the weighing device 50, whereas the weighing device 54 is actuated by articles which are too light to actuate the weighing device 52. When the articles to be sorted are graded only for those which are overweight, within predetermined weight limits, and underweight, three weighing devices, as shown, will be sufficient. However, when the articles are to be graded further, any suitable number of weighing devices may be employed.

When weighing articles such as 20 millimeter projectiles, for which the present invention is particularly suitable, the articles are fed into position to be engaged by the pins 36 of the article moving means by passage down an inclined tray 56. The projectiles, shown at 58, roll forward by gravity so that as soon as one article is removed from the tray the others advance automatically into position to be engaged by the first pin 36 of the article moving means upon the next cycle of operation. As the projectiles are moved to the left, as seen in Fig. 2, by the first pin of the article moving means, they pass from the tray 56 onto the article receiving members 42 of the first weighing device 50 and into a centered position with respect to the weighing device. As shown in Fig. 3 the pins 36 are adjustable with respect to the bar 18 by nuts 60 and may be so positioned that upon moving upward during the final period in which the projectile is advanced, they move out of engagement with the projectile only when the projectile has been moved to a predetermined position on the article receiving members. By proper adjustment of the pin 36 the projectiles may be accurately positioned with respect to each weighing device. It will be noted also that as the pin 36 moves upward it tends to raise the projectile and thus avoids placing of any strains upon the weighing device by reason of the moving and positioning of a projectile.

If the projectile deposited on the weighing device 50 is over-weight the balance beam will tilt from the full line position to the dotted line position, as shown in Fig. 4, and will discharge the projectile into the channel or receptacle 61 in which over-weight articles are collected. However, if the projectile is not heavy enough to actuate the weighing device 50 it will be held in the full line position of Fig. 4 and during the next cycle of operation the central pin 36 on the rod 18 of the article moving means will engage the projectile and move it forward so as to advance the projectile into a centered position with respect to the second weighing device 52. At the same time another projectile will be advanced from the tray 56 to the first weighing device 50. If the projectile on the central weighing device 52 is within the tolerance permitted, the balance beam will be tilted and the projectile will be discharged into the second receptacle 62 in which the acceptable projectiles are collected. However, if it is under-weight it will be held in the full line position of Fig. 4 and thereafter be advanced to the final weighing device 54 which discharges all projectiles received into the receptacle 64 for the under-weight projectiles.

It is found in practice that the tolerance permitted on projectiles is extremely small and therefore the weighing device must be very sensitive in operation to insure proper sorting of the projectiles. In the case of 20 mm. projectiles which weigh 2500 grains, the permissible tolerance is only plus or minus 25 grains. The weighing device 50 is therefore adjusted to reject or discharge all projectiles which weigh more than 2525 grains, whereas the central weighing device is adjusted to discharge all projectiles which weigh less than 2525 but more than 2475 grains. Those projectiles weighing less than 2475 grains are passed on to the weighing device 54 which is adjusted to discharge all projectiles which it receives.

Because of the high degree of accuracy required in such weighing operations it is important to avoid vibration which might be transmitted from one weighing device to another if the balance beam were allowed to drop back freely after discharging the projectile. Furthermore, it is important to eliminate shocks upon the pivot pins for the balance beam since such shocks injure the bearings and render the weighing device inaccurate. The greatest difficulty arises when a projectile of borderline weight is deposited on the weighing device, since the balance beam then tends to move only very slowly from the elevated position shown in full lines in Fig. 4 to the discharge position shown in dotted lines. In order to accelerate movement of the balance beam when it first starts to descend the counter weight 66 is located above the pivot pin 40 and in position to add its weight to that of the projectile when the balance beam is tilted sufficiently to move the weight 66 forward or to the right as shown in Fig. 4 beyond the pivot 40. In this way the operation of the weighing device is rendered positive and faulty action of the weighing device is avoided.

In order to restore any tilted balance beams to a horizontal position and locate the article receiving members 42 thereof in alignment prior to advancing the projectiles from one weighing device to another, a scale locking bar 68 is provided. This bar extends longitudinally of the device above the balance beams 38 as shown in Figs. 1 and 4. The locking bar is connected to the cranks 70 secured to the rock shafts 72 on which the rocker members 22 and 24 are mounted. The locking bar is thus raised and lowered in timed relation to the operation of the article moving means and bar 18 and is lowered to bring the article receiving members of the weighing devices into alignment prior to the advance of the projectiles from one weighing device to the next. The locking bar is raised shortly after the pins 36 move upward out of engagement with the projectiles so that the weighing devices are rendered inoperative until the projectiles have been advanced and properly located with respect to each weighing device. After the weighing device has had an opportunity to be actuated by the projectile thereon, the locking bar is lowered to engage the balance beams 38 and restores those which have been tilted to their proper positions.

Figure 6:
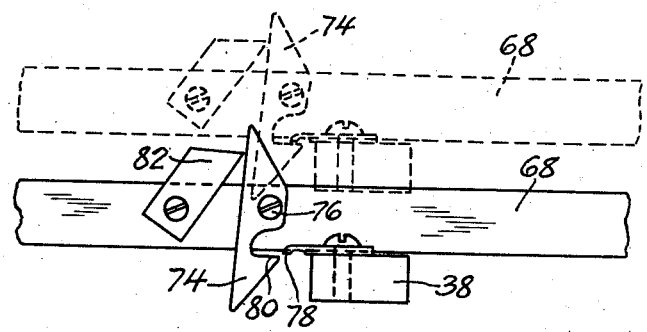
Fig. 6 is a vertical sectional view of a portion of the device showing a preferred form of control means for a balance beam of the weighing device of Fig. 5.

In order further to avoid vibration of the device which might influence the weighing operation, means are provided for holding a tilted balance beam in a tilted position so that it cannot drop back suddenly and jar the device or injure the pivots upon which the balance beam is mounted. A preferred construction provided for this purpose is illustrated in Fig. 6 and includes a holding member 74 pivotally mounted at 76 on the locking bar 68. The balance beam is provided with a laterally projecting tongue 78 which when raised to the dotted line position of Fig. 6 will be engaged by the projection 80 on the pivoted holding member 74 as the locking bar is raised and moved to the right, as seen in Fig. 6. The balance beam will then be held in tilted position until the locking bar descends to lock all of the balance beams. The holding member will then be caused to disengage the projection 80, since the bar 68 moves to the left as it descends and the stop 82 prevents the holding member from swinging to remain engaged with the tongue 78.

If the balance beam has not been tilted the projection 80 on the holding member will clear the tongue 78 on the balance beam as it moves upward and to the right, and therefore the holding member 74 will only engage those balance beams which have been tilted. Since the balance beams cannot drop back after discharge of a projectile they are lowered slowly as the locking bar moves downward and there is no jarring or shock which might injure the pivot pins or their bearings or influence the operation of other weighing devices. In fact tilting of the balance beam under the weight of a projectile is controlled by the locking bar, since the balance beam cannot move before the locking bar rises, and the right hand end of the beam then rises with the locking bar and becomes latched up in tilted position by the holding member 74.

With this construction both the movement of the projectiles from one weighing device to another and the operation of the balance beam is caused to take place very smoothly and deliberately and the projectiles are discharged without any jerking or loose connections which might adversely affect the weighing operation or cause excessive wear or injury to the parts. This is of particular importance when the weighing or grading operations must be done with a high degree of accuracy or with relatively heavy objects.

While the invention has been described with particular reference to its use in weighing projectiles it will be apparent that the device may be used for weighing any other articles such as eggs, packages, cans, bottles, golf balls, roller bearings, and the like. Moreover, the number of groups into which the articles are separated may be increased as desired in any particular weighing or sorting operation by increasing the number of weighing devices employed. It will therefore be apparent that many changes may be made in the form, arrangement and construction of the elements used in the device without departing from the spirit and scope of the invention. In view thereof it should be understood that the form of the present invention herein shown and described is intended to be illustrative only and is not intended to limit the scope of the following claims.

We claim:

1. A device for grading articles by weight, comprising a plurality of weighing devices adjusted to respond to progressively decreasing weights and each having a balance beam, article receiving members connected to the balance beams of said weighing devices and arranged in longitudinal alignment with those of adjacent weighing devices to form a track along which articles may be moved from one weighing device to another, article moving means including a bar located above the article receiving members and having downwardly extending means thereon spaced apart a distance approximately equal to the length of said members, means for simultaneously reciprocating and raising and lowering said bar whereby it is caused to travel in an elliptical path in which the downwardly extending means engage articles located on said members during a portion only of each cycle of movement, and push the article along the article receiving members to a weighing position and then move out of engagement with the articles in a smooth vibrationless movement.

2. A weighing device having a tiltable balance beam, a member movable into and out of engagement with said balance beam to restore it to a substantially horizontal position after tilting thereof, and latch means carried by said member and engageable with said balance beam on tilting thereof to hold the balance beam in a tilted position until restored by said member.

3. A device for grading articles by weight comprising a plurality of weighing devices adjusted to respond to progressively decreasing weights and each having a tiltable balance beam, article receiving members connected to said balance beams and arranged in longitudinal alignment to form a track along which articles to be weighed may be moved, means for moving articles one after another along said track into position to be weighed by said weighing devices, locking means movable vertically into and out of engagement with said balance beams to restore said beams to a horizontal position in which the article receiving members are aligned and to release said beams for tilting, and latch means carried by said locking means and engageable by said balance beams on tilting thereof to hold said beams tilted until restored to a horizontal position by said locking means.

4. A device for grading articles by weight, comprising a plurality of weighing devices adjusted to respond to progressively decreasing weights and each having a balance beam, article receiving members connected to the balance beams of said weighing devices and arranged in longitudinal alignment with those of adjacent weighing devices to form a track along which articles may be moved from one weighing device to another, article moving means including a member having a plurality of elements fixedly secured thereto and projecting toward said track, said elements being spaced apart longitudinally of said track a distance approximately equal to the length of the article receiving members on the balance beams, means for continuously moving said member and elements of the article moving means through an elliptical path lying in a plane including the article receiving members of said weighing devices so that said elements will move into engagement with articles to be weighed and push the articles along the article receiving members to a weighing position and then move out of engagement with the article in a smooth vibrationless movement.

5. A device for grading articles by weight comprising a plurality of weighing devices adjusted to respond to progressively decreasing weights and each having a balance beam with means thereon for receiving and supporting an article to be weighed, means for moving articles into and out of position on said article receiving means including a member extending longitudinally past said weighing devices and located above said article receiving means, article engaging elements extending downward from said member and spaced apart predetermined distances at least equal to the length of the articles to be weighed, rollers supporting said member, means for reciprocating said member a distance exceeding the length of the articles to be weighed, and means for raising and lowering said rollers in timed relation to reciprocation of said member to cause said member and elements to travel in an elliptical path in which said elements descend between successive articles and engage and advance the articles one step at a time in their travel from one weighing device to another and thereafter are raised from engagement with the articles.

6. A device for grading articles by weight comprising a plurality of weighing devices adjusted to respond to progressively decreasing weights and each having a balance beam with means thereon for receiving and supporting an article to be weighed, means for moving articles into and out of position on said article receiving means including a member extending longitudinally past said weighing devices and located above said article receiving means, article engaging elements fixedly secured to said member and extending downward therefrom, said elements being spaced apart predetermined distances at least equal to the length of the articles to be weighed, rollers supporting said member, means for reciprocating said member a distance exceeding the length of the articles to be weighed, and means for raising and lowering said rollers in timed relation to reciprocation of said member to cause said member and elements to travel in an elliptical path in which said elements descend between successive articles and engage and advance the articles one step at a time in their travel from one weighing device to another and thereafter are raised from engagement with the articles.

HERBERT O. NIEDERER.
OTTO C. NIEDERER.

REFERENCES CITED

The following references are of record in the file of this patent:

UNITED STATES PATENTS

| Number | Name | Date |
|---|---|---|
| 2,076,617 | Cleaves | Apr. 13, 1937 |
| 2,303,140 | Sackett | Nov. 24, 1942 |
| 2,235,877 | Guggenheim | Mar. 25, 1941 |
| 2,099,893 | Jones | Nov. 23, 1937 |
| 2,232,437 | Bushman | Feb. 18, 1941 |
| 1,927,625 | Baumann | Sept. 19, 1933 |
| 2,037,484 | Raymer | Apr. 14, 1936 |

FOREIGN PATENTS

| Number | Country | Date |
|---|---|---|
| 625,621 | Germany | Feb. 12, 1936 |